US009555755B2

(12) United States Patent
Franiak et al.

(10) Patent No.: US 9,555,755 B2
(45) Date of Patent: Jan. 31, 2017

(54) REAR GUARD ASSEMBLY (71) Applicant: Wastequip, LLC, Charlotte, NC (US)

(72) Inventors: Nicholas S. Franiak, Francesville, IN (US); Nathan L. Martindale, Star City, IN (US)

(73) Assignee: WASTEQUIP, LLC, Charlotte, NC (US)

(*) Notice: Subject to any disclaimer, the term of this patent is extended or adjusted under 35 U.S.C. 154(b) by 32 days.

(21) Appl. No.: 14/600,539

(22) Filed: Jan. 20, 2015

(65) Prior Publication Data
US 2016/0207483 A1 Jul. 21, 2016

(51) Int. Cl.
B60R 19/38 (2006.01)
B60R 19/26 (2006.01)
B60R 19/02 (2006.01)
B60R 19/56 (2006.01)

(52) U.S. Cl.
CPC ............. B60R 19/26 (2013.01); B60R 19/023 (2013.01); B60R 19/56 (2013.01)

(58) Field of Classification Search
CPC ........ E01F 15/02; B60R 19/26; B60R 19/023; B60R 19/56
USPC ............................................ 293/131, 187.02
See application file for complete search history.

(56) References Cited

U.S. PATENT DOCUMENTS

| 5,507,546 A * | 4/1996 | Holley | B60R 19/56 180/276 |
| 6,109,675 A * | 8/2000 | Sumrall | B60R 19/56 293/117 |
| 6,116,667 A * | 9/2000 | Torcomian | B60R 19/56 293/132 |
| 6,604,765 B1 * | 8/2003 | Eull | B60R 19/56 293/104 |
| 6,764,116 B2 * | 7/2004 | Ledford | B60R 19/56 293/102 |

(Continued)

OTHER PUBLICATIONS

National Highway Traffic Safety Administration, Department of Transportation, Authenticated U.S. Government Information, GPO, 49 CFR Ch. V, § 571.223, Standard No. 223; Rear Impact Guards, pp. 1056-1061.

(Continued)

*Primary Examiner* — Pinel Romain
(74) *Attorney, Agent, or Firm* — Nelson Mullins Riley & Scarborough LLP (57) ABSTRACT A rear guard assembly for mounting to a chassis of a motor vehicle. The rear guard assembly can comprise a rearward-facing guard plate and a pair of braces mounted to the rearward-facing guard plate. Each brace can comprise a collapsible shock absorber comprising a first end and a second end, wherein a longitudinal axis is aligned with the first end and the second end. Each brace can comprise a plurality of outwardly-deflecting portions between the first end and the second end, wherein a lateral axis traverses the outwardly-deflecting portions and is oriented perpendicular to the longitudinal axis, and wherein the outwardly-deflecting portions are symmetrical relative to the longitudinal axis and the lateral axis. A spacing block can be positioned intermediate the outwardly-deflecting portions and the rearward-facing guard plate. A support assembly can be connected to each brace and can include fixed arms and pivot arms.

19 Claims, 7 Drawing Sheets (56) References Cited

U.S. PATENT DOCUMENTS

| | | | |
|---|---|---|---|
| 7,216,904 B2* | 5/2007 | Thomas | B60R 19/56 |
| | | | 293/102 |
| 2001/0030431 A1* | 10/2001 | Killday | B60R 19/56 |
| | | | 293/118 |
| 2013/0089397 A1 | 4/2013 | Downing et al. | |
| 2016/0101752 A1* | 4/2016 | Batzer | B62D 53/068 |
| | | | 293/126 |

OTHER PUBLICATIONS

National Highway Traffic Safety Administration. Department of Transportation, Authenticated U.S. Government Information, GPO, 49 CFR Ch. V. § 571.224, Standard No. 224; Rear Impact Protection. pp. 1006-1009.

Transport Canada Safety and Security, Standards and Regulations Division, Test Method 223 "Rear impact Guard", Dec. 2003, 10 pages.

* cited by examiner

REAR GUARD ASSEMBLY

FIELD

The present disclosure relates to rear guards and guard support frames and methods for assembling and using the same.

BACKGROUND

A rear guard can be mounted to a vehicle and/or a trailer to at least partially absorb the impact of a collision with another vehicle. For example, in a rear-end collision when a striking vehicle collides with the rear of a vehicle and/or trailer having a rear guard, the rear guard can limit travel of the striking vehicle under and/or into the vehicle and/or trailer having the rear guard. Accordingly, the rear guard can provide a safety mechanism that seeks to reduce the incidence and/or severity of injuries and/or damage sustained during a rear-end collision.

In certain jurisdictions, regulations govern the use and/or standards of rear guards. For example, in the United States, the Federal Motor Vehicle Safety Standard No. 223 (hereinafter "U.S. Standard 223") and the Federal Motor Vehicle Safety Standard No. 224, which are hereby incorporated by reference herein in their respective entireties, specifies requirements for rear impact guards for trailers and semitrailers. U.S. Standard 223 sets forth requirements related to the dimensions of the rear guard, the strength and energy absorption of the rear guard, labeling of the rear guard, and hardware and installation instruction requirements. For example, U.S. Standard 223 requires a rear guard to absorb by plastic deformation at least 5,650 J of energy within the first 125 mm of deflection at a certain location on the guard. U.S. Standard 223 also requires the rear guard to resist various forces without deflecting by more than 125 mm. Other jurisdictions also govern the use and standards of rear guards. For example, in Canada, the Motor Vehicle Safety Regulation Standard 223 (hereinafter "Canadian Standard 223), which is hereby incorporated by reference herein in its entirety, specifies requirements for rear impact guards for trailers and semitrailers. Canadian Standard 223 requires a rear impact guard to absorb by plastic deformation at least 20 kJ of energy within the first 125 mm of deflection. Canadian Standard 223 also requires rear impact guards to withstand a force of 350 kN. Additional requirements of U.S. Standard 223 and Canadian Standard 223 are set forth herein and described with particularity in the Standards themselves, which have been incorporated by reference herein in their respective entireties. The various regulations governing rear guards often aim to soften the impact of a collision to protect the occupant(s) and/or load(s) while controlling travel of the striking vehicle relative to the rear guard.

The foregoing discussion is intended only to illustrate various aspects of the related art in the field of the invention at the time, and should not be taken as a disavowal of claim scope.

SUMMARY

In at least one form, a rear guard assembly for mounting to a chassis of a motor vehicle comprises a rearward-facing guard plate and a plurality of braces mounted to the rearward-facing guard plate, and each brace comprises a collapsible shock absorber. Each collapsible shock absorber comprises a first end and a second end, and a longitudinal axis is aligned with the first end and the second end. Each collapsible shock absorber also comprises a plurality of outwardly-deflecting portions between the first end and the second end, a lateral axis traverses the outwardly-deflecting portions and is oriented perpendicular to the longitudinal axis, and the outwardly-deflecting portions are symmetrical relative to the longitudinal axis and the lateral axis. Each brace also comprises a spacing block positioned intermediate the outwardly-deflecting portions and the rearward-facing guard plate. The guard assembly also comprises a support assembly connected to each brace, and the support assembly comprises a plurality of arms configured to pivot relative to the chassis and a plurality of arms fixedly mounted to the chassis.

In at least one form, a guard assembly comprises a support assembly comprising a plurality of arms and a plurality of braces, each brace is supported by one of the arms of the support assembly, and each brace comprises a collapsible stiffener comprising a pair of symmetrical folds and a spacer positioned intermediate the pair of symmetrical folds. The guard assembly also comprises a rearward-facing guard plate mounted to the plurality of braces.

In at least one form, each brace further comprises a support plate comprising a pair of angled supports, and the collapsible stiffener is positioned intermediate the angled supports.

In at least one form, the plurality of arms comprises a pivot arm coupled to each brace, and the pivot arms comprise I-beams. In at least one form, the plurality of arms further comprises a pair of fixed arms, and each fixed arm comprises a pair of stiffening plates and a support gusset.

In at least one form, a longitudinal axis is aligned with the pivot arm coupled to each brace, and each brace is symmetrical relative to the longitudinal axis. In at least one form, the symmetrical folds are configured to deflect laterally with respect to the longitudinal axis.

In at least one form, a guard assembly comprises a guard plate and a plurality of braces mounted to the guard plate, each brace comprises a collapsible shock absorber comprising a first end and a second end, and a longitudinal axis is aligned with the first end and the second end. Each collapsible shock absorber also comprises a plurality of outwardly-protruding portions between the first end and the second end, a lateral axis traverses the outwardly-protruding portions and is oriented perpendicular to the longitudinal axis, and the outwardly-protruding portions are symmetrical relative to the lateral axis.

In at least one form, the collapsible shock absorber is symmetrical relative to the longitudinal axis.

In at least one form, the collapsible shock absorber comprises a hexagonal geometry, and each outwardly-protruding portion forms a pair of sides of the hexagonal geometry.

In at least one form, the outwardly-protruding portions are configured to deflect outward along the lateral axis when the second end moves toward the first end along the longitudinal axis.

In at least one form, the guard assembly further comprises a spacer positioned between the first end and the second end.

In at least one form, each brace further comprises an outside member, and one of the collapsible shock absorbers is positioned between the guard plate and the outside member of each brace.

In at least one form, each outside member comprises a first end portion mounted to the guard plate, a second end portion mounted to the guard plate, and an intermediate portion mounted to the collapsible shock absorber. In at least one form, the first end of each collapsible shock absorber is fastened to the intermediate portion of the outside member of the same brace.

In at least one form, the outside member is symmetrical relative to the longitudinal axis.

In at least one form, each outside member and each collapsible shock absorber are welded to the guard plate.

In at least one form, the guard assembly further comprising a support assembly comprising a plurality of pivot arms. In at least one form, the plurality of pivot arms comprises a pivot arm coupled to each brace, and the pivot arms comprise I-beams.

In at least one form, the support assembly further comprises a pair of fixed arms, and each fixed arm comprises a pair of stiffening plates and a support gusset.

The foregoing discussion is intended only to illustrate various aspects of certain embodiments disclosed in the present disclosure and should not be taken as a disavowal of claim scope.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings as follows:

The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims. For example, the features illustrated or described in connection with one exemplary embodiment may be combined with the features of other embodiments. Such modifications and variations are intended to be included within the scope of the present disclosure.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

Figure 1:
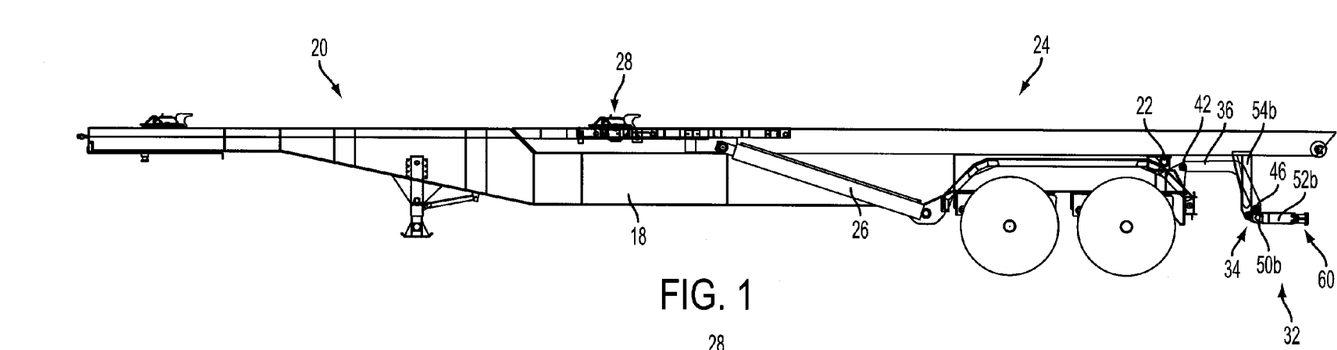
FIG. 1 is an elevation view of a trailer and a hoist frame, depicting the hoist frame in a lowered orientation, according to various embodiments of the present disclosure.
Figure 2:
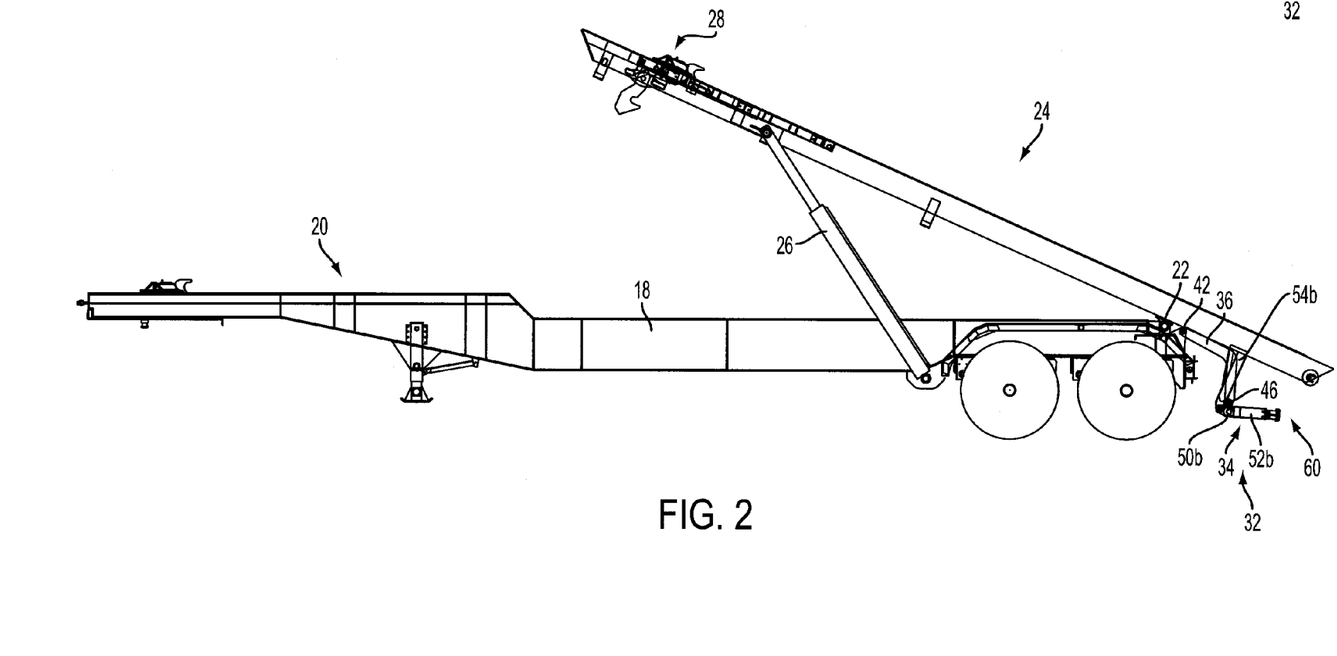
FIG. 2 is an elevation view of the trailer and the hoist frame of FIG. 1, depicting the hoist frame in a first lifted orientation, according to various embodiments of the present disclosure.
Figure 3:
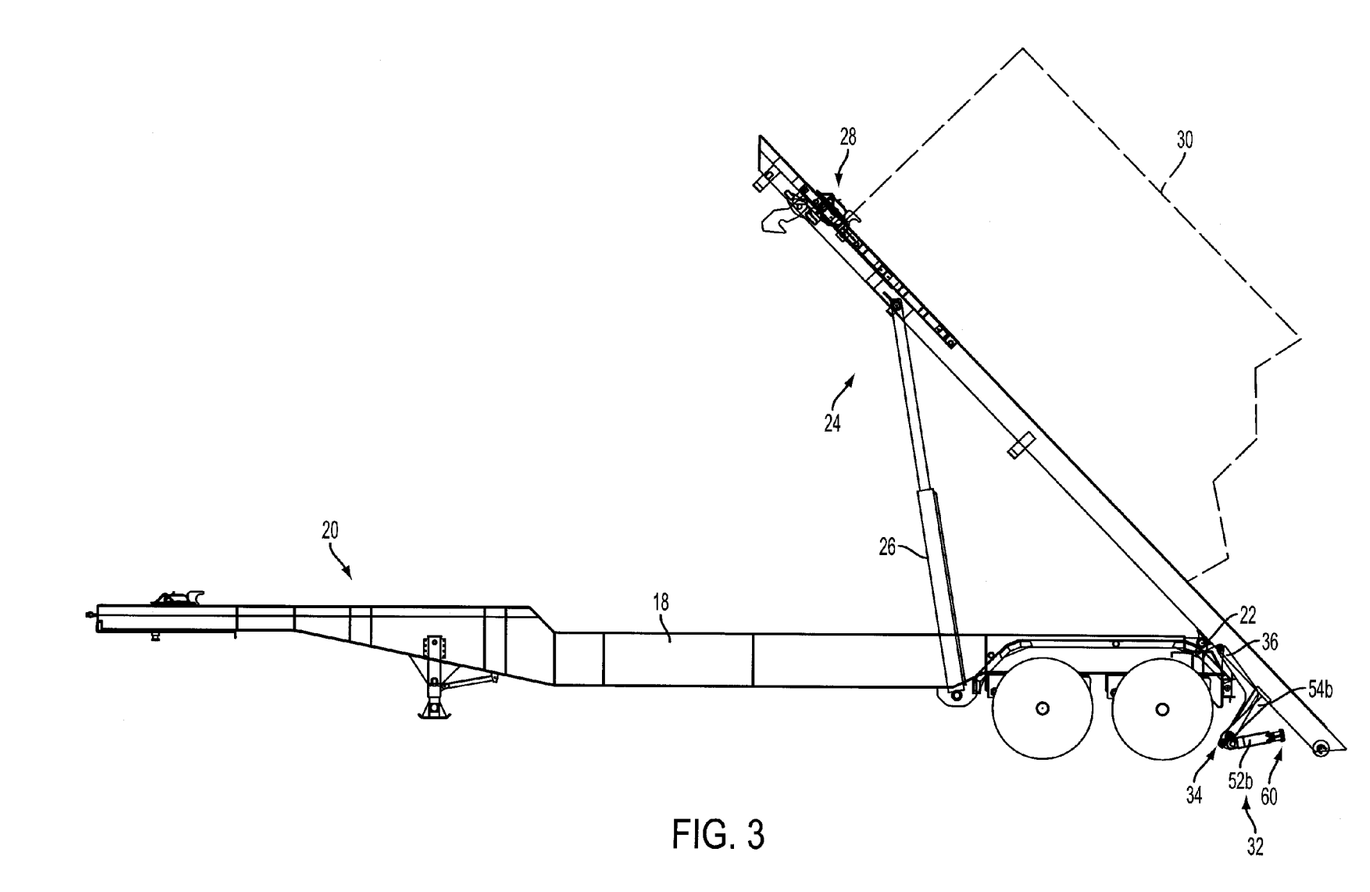
FIG. 3 is an elevation view of the trailer and the hoist frame of FIG. 1, depicting the hoist frame in a second lifted orientation, and further depicting a container in transparency hoisted onto the hoist frame, according to various embodiments of the present disclosure.

Referring primarily to FIGS. 1-3, a trailer 20 is depicted. The trailer 20 can form a portion of the chassis of a motor vehicle and/or can be coupled to and/or towed by a motor vehicle, for example. The trailer 20 can include a guard assembly 32 comprised of a rear guard 60 and a support assembly 34. As described herein, the rear guard 60 can be mounted to the trailer 20 by the support assembly 34. The guard assembly 32 can be configured to at least partially absorb the impact of a rear-end collision of a striking vehicle with the trailer 20.

The trailer 20 shown in FIGS. 1-3 includes a fixed frame 18 and a hoist frame 24 that is pivotably connected to the fixed frame 18 of the trailer 20. For example, the hoist frame 24 is configured to move between a lowered orientation (FIG. 1) and at least one lifted orientation (see, e.g., FIGS. 2 and 3) relative to the fixed frame 18 of the trailer 20. The hoist frame 24 is supported by a drive system 26, which is configured to drive and/or tilt the hoist frame 24 upwards and away from the trailer 20. In various instances, the drive system 26 can comprise a pair of hydraulic cylinders, for example. A drive system is described in U.S. patent application Ser. No. 12/576,776, entitled HOIST APPARATUS, filed on Oct. 10, 2012, now U.S. Patent Application Publication No. 2013/0089397, which is hereby incorporated by reference herein in its entirety. The reader will appreciate that various drive systems can be employed with the hoist frame 24 and trailer 20 depicted in FIGS. 1-3. The hoist frame 24 can be pivotably connected to the fixed frame 18 of the trailer 20 at a hinge 22. For example, the hinged pin connection 22 can permit the hoist frame 24 to pivot or tilt relative to the fixed frame 18 of the trailer 20.

In various instances, the hoist frame 24 can be pivoted relative to the fixed frame 18 of the trailer 20 to facilitate loading of a container 30 (FIG. 3) onto the trailer 20. For example, the hoist frame 24 can further include a pulley system 28. In various instances, the pulley system 28 can be configured to engage a container, such as the container 30 (FIG. 3) and pull the container 30 onto the hoist frame 24. Thereafter, the hoist frame 24 can be lowered (FIG. 1), for example, and the container 30 can be positioned on the trailer 20. In various instances, the hoist frame 24 can also be lifted to a first lifted orientation (FIG. 2) or a second lifted orientation (FIG. 3) to unload the container 30 and/or to dump the contents of the container 30, for example. A pulley system for loading a container onto a hoist frame is described in U.S. patent application Ser. No. 12/576,776, entitled HOIST APPARATUS, filed on Oct. 10, 2012, now U.S. Patent Application Publication No. 2013/0089397, which has been incorporated by reference herein in its entirety.

Figure 4:
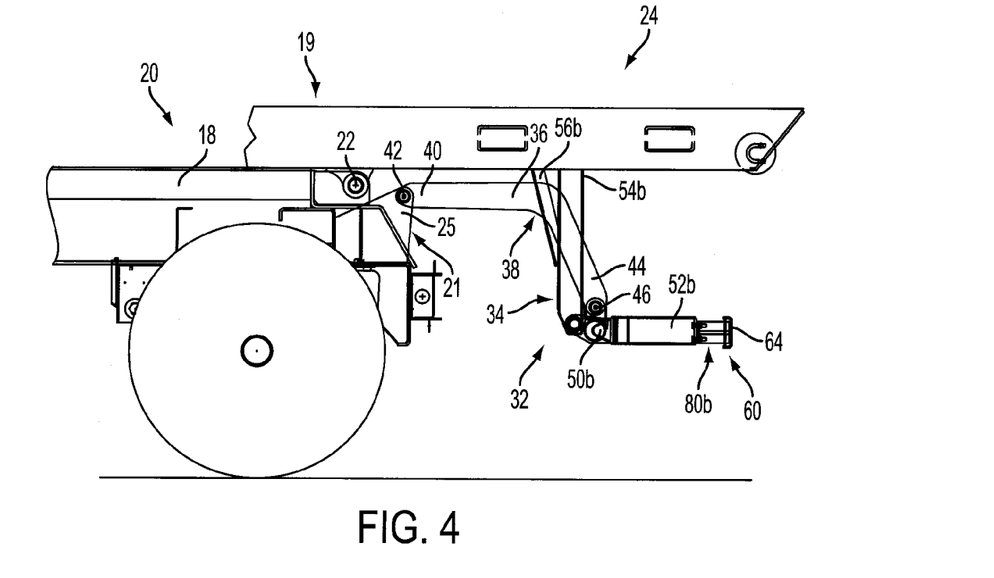
FIG. 4 is a partial view of the trailer and the hoist frame of FIG. 1, depicting the hoist frame in the lowered orientation of FIG. 1 and a support assembly mounted to the trailer and the hoist frame, wherein the support assembly is depicted in an extended configuration, according to various embodiments of the present disclosure.
Figure 5:
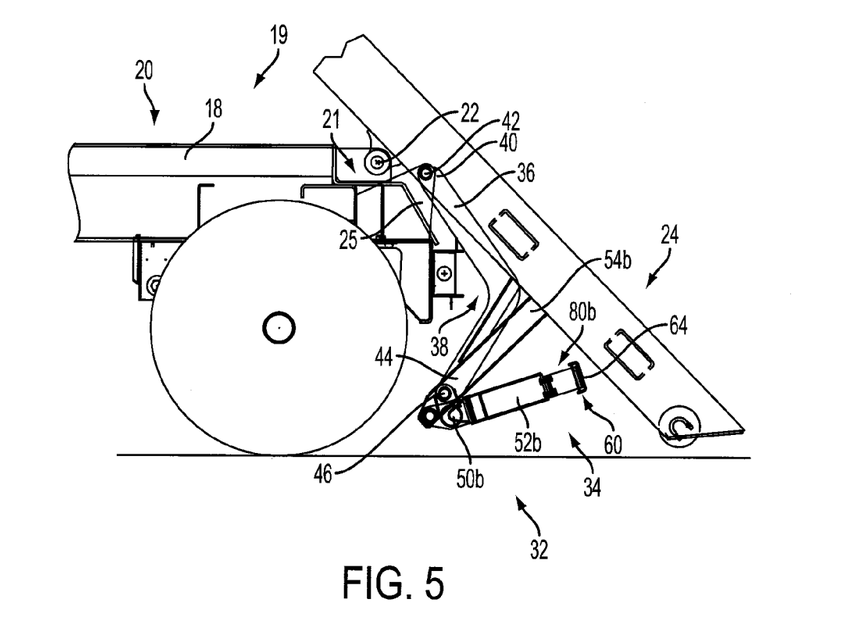
FIG. 5 is a partial view of the trailer and the hoist frame of FIG. 1, depicting the hoist frame in the second lifted orientation of FIG. 3, and further depicting the support assembly of FIG. 4 in a compacted configuration, according to various embodiments of the present disclosure.
Figures 6, 7:
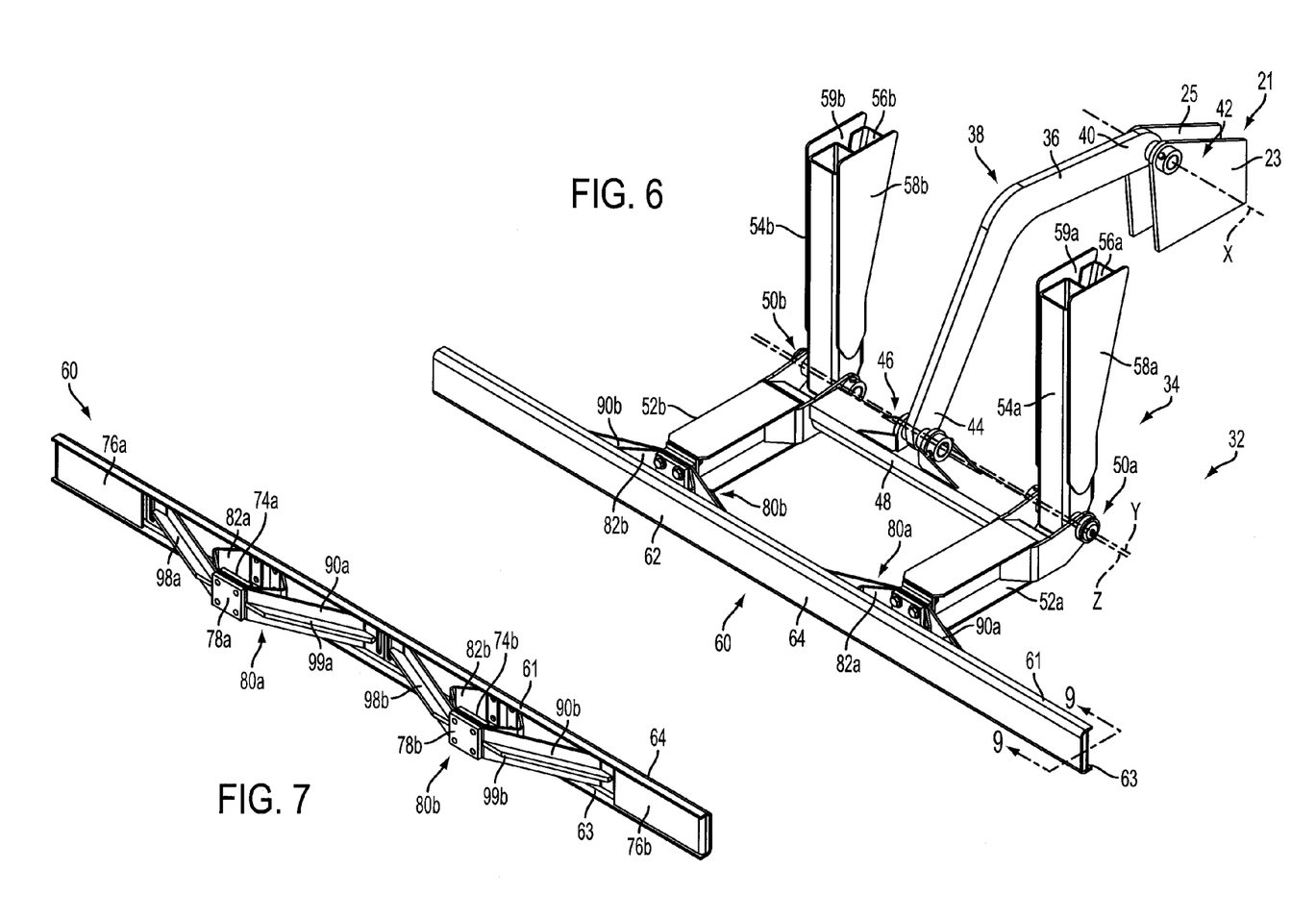
FIG. 6 is a perspective view of the support assembly of FIG. 4 in the extended orientation, further depicting a rear guard at the rear end of the support assembly, according to various embodiments of the present disclosure.
FIG. 7 is a perspective view of the rear guard of FIG. 6, according to various embodiments of the present disclosure.
Figure 8:
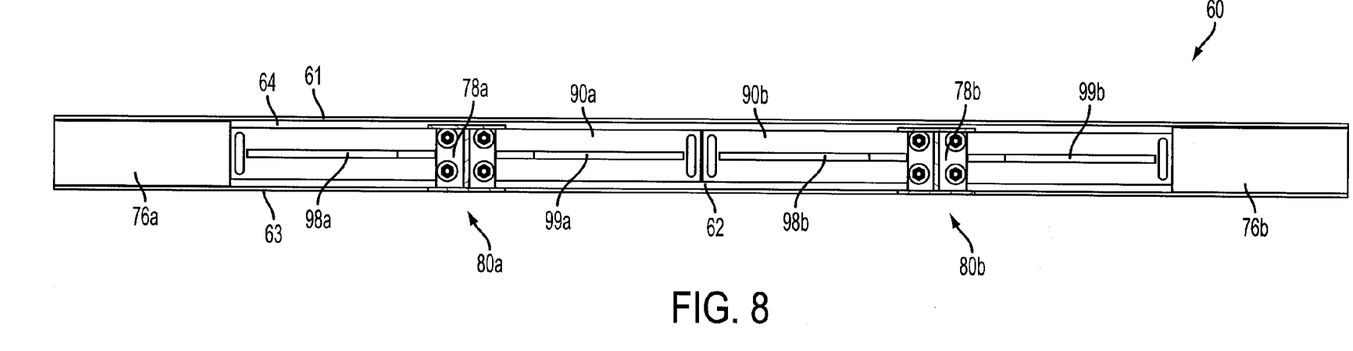
FIG. 8 is an elevation view of the rear guard of FIG. 6, according to various embodiments of the present disclosure.
Figure 9:
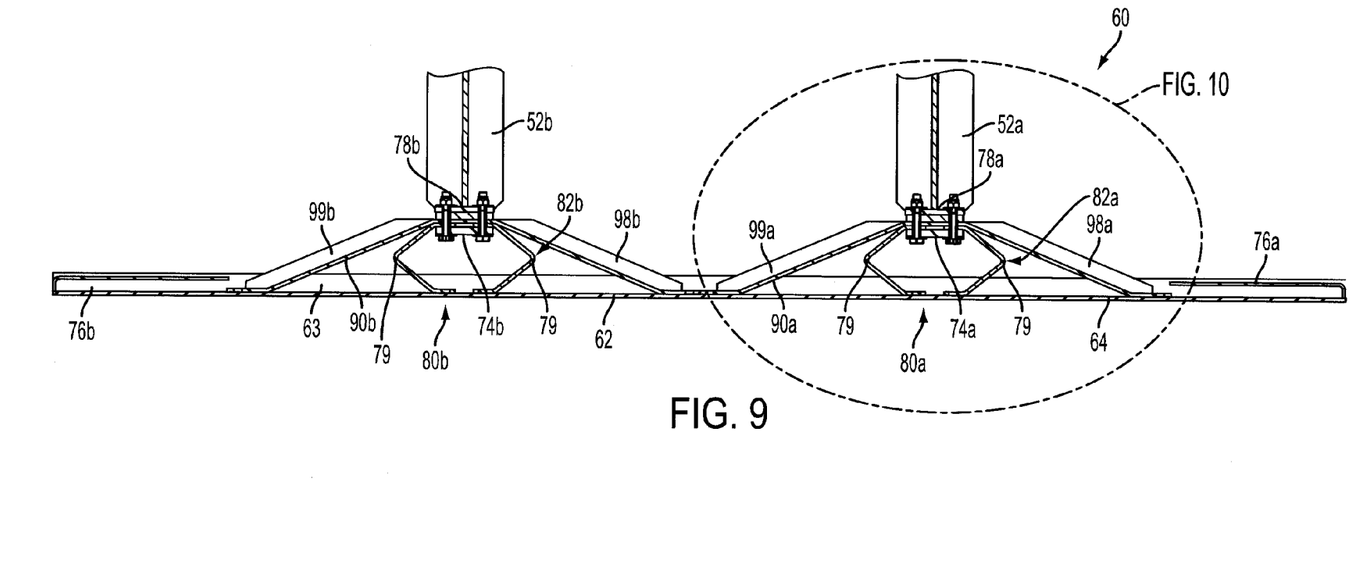
FIG. 9 is a plan, cross-sectional view of the rear guard of FIG. 6 secured to pivot arms of the support assembly of FIG. 4 taken along the plane 9-9 indicated in FIG. 6, according to various embodiments of the present disclosure.

Referring primarily now to FIG. 4-6, the support assembly 34, which operably supports the rear guard 60, can be mounted to the trailer 20 at a mount 21. The mount 21 can be coupled to a rear end 19 (FIGS. 4 and 5) of the fixed frame 18 of the trailer 20. In various instances, the mount 21 can be securely fastened to the trailer 20 and/or integrally formed with the fixed frame 18 of the trailer 20, for example. As described herein, the collapsible support assembly 34 can extend from the mount assembly 21 and can movably support the rear guard 60, which is configured to at least partially absorb the impact of a rear-end collision. For example, the support assembly 34 holds the rear guard 60 in a collision-ready position relative to the trailer 20 and can operably lift the rear guard 60 out of contact with the ground when the hoist frame 24 is moved to one of the lifted orientations (see, e.g., FIGS. 2 and 3). The support assembly 34 is also mounted to the hoist frame 24 of the trailer 20, as described herein.

Referring primarily to FIG. 6, the mount assembly 21 includes a pair of plates 23 and 25, and the support assembly 34 is retained between the plates 23 and 25. The support assembly 34 is pivotably connected to the mount 21, such that the support assembly 34 and/or portions thereof can pivot relative to the fixed frame 18. For example, the support assembly 34 can be coupled to the mount 21 at a first pivot joint 42, which permits rotation of the support assembly 34 around an axis X (FIG. 6), for example. Referring primarily to FIGS. 4 and 5, the first pivot joint 42 is positioned rearward and below the hinged pin connection 22.

Referring still primarily to FIG. 6, the support assembly 34 is configured to support the rear guard 60. Moreover, the support assembly 34 is configured to move between a compacted orientation (FIGS. 3 and 5) and an extended orientation (FIGS. 1, 4 and 6). For example, the support assembly 34 can move to the compacted orientation when the hoist frame 24 is moved to a lifted configuration (FIGS. 2 and 3) by the drive system 26 to ensure that the rear guard 60 is lifted out of contact with the ground. To facilitate movement of the support assembly 34 from the compacted orientation to the extended orientation, the support assembly 34 includes at least one pivot arm.

For example, referring still to FIG. 6, a first pivot arm 36 extends from the first pivot joint 42. In the depicted embodiment, the first pivot arm 36 includes a first end 40, a second end 44, and a non-linear contour 38 intermediate the first end 40 and the second end 44. In such instances, the first pivot arm 36 can define a boomerang shape. As described herein, the pivot arm 36 can be configured to pivot at the first articulation joint 42 and the boomerang shape can be designed to prevent the pivot arm 36 from contacting and/or interfering with other components of the trailer 20 and/or the support assembly 34 as the support assembly 34 pivots between the compacted orientation (FIGS. 3 and 5) and the extended configuration (FIGS. 1, 4, and 6) described herein. The first end 40 of the first pivot arm 36 is coupled to the first pivot joint 42. Moreover, the second end 44 is coupled to a second pivot joint 46. As shown in FIG. 6, a transverse arm 48 is also coupled to the second pivot joint 46. Accordingly, the second pivot joint 46 can permit rotation of the transverse arm 48 relative to the first pivot arm 36 and around an axis Y (FIG. 6), for example.

In various instances, the transverse arm 48 can be supported by the first pivot arm 36 at an intermediate portion along the length of the transverse arm 48. For example, the transverse arm 48 can be supported by the first pivot arm 36 at the midpoint of the transverse arm 48. Referring still to the embodiment depicted in FIG. 6, the transverse arm 48 can extend between a pair of second pivot arms 52a, 52b. For example, the pivot arm 52a can be coupled to a first end of the transverse arm 48, and the pivot arm 52b can be coupled to a second end of the transverse arm 48, for example. In the depicted embodiment, the second pivot arms 52a, 52b are spaced an equal distance from the midpoint of the transverse arm 48 and an equal distance from the first pivot arm 36.

Each second pivot arm 52a, 52b can also be supported by a fixed arm 54a, 54b, respectively. The fixed arms 54a, 54b can be rigidly and/or fixedly secured to and/or integrally formed with the hoist frame 24, for example. As a result, the fixed arms 54a, 54b can move with the hoist frame 24 as the hoist frame 24 moves between the lowered orientation (FIG. 1) and the lifted orientations (FIGS. 2 and 3). Accordingly, the fixed arms 54a, 54b can control and/or constrain movement of the second pivot arms 52a, 52b. For example, as the hoist frame 24 pivots clockwise from the lowered orientation toward one of the lifted orientations, the fixed arms 54a, 54b can be pivoted clockwise, as well. Moreover, clockwise rotation of the fixed arms 54a, 54b can draw the second pivot arms 52a, 52b forward, which can shift the transverse arm 48 forward and affect rotation of the transverse arm 48 at the second pivot joint 46 and rotation of the first pivot arm 36 at the first pivot joint 42, for example. In such instances, pivoting of the hoist frame 24 to the second lifted orientation (FIG. 3) can move the support assembly 34 between the extended orientation (FIGS. 1, 4 and 6) and the compacted orientation (FIGS. 3 and 5).

In various instances, the fixed arms 54a, 54b can comprise tubular members. Referring still to the embodiment depicted in FIG. 6, each fixed arm 54a, 54b includes a pair of stiffening plates and a support gusset between the stiffening plates of each fixed arm 54a, 54b. For example, the first fixed arm 54a includes a first stiffening plate 58a, a second stiffening plate 59a, and a support gusset 56a therebetween, and the second fixed arm 54b includes a second stiffening plate 58b, a second stiffening plate 59b, and a support gusset 56b therebetween. The stiffening plates 58a, 58b, 59a, 59d can be fastened and/or secured to the fixed arms 54a, 54b.

Additionally, the stiffening plates 58a, 58b, 59a, 59d can be secured to the hoist frame 24. For example, a stiffening plate 58a, 58b, 59a, 59d can be welded to either side of each fixed arm 54a, 54b and/or welded to the hoist frame 24. In various instances, the stiffening plates 58a, 58b, 59a, 59b can extend along at least a portion of the length of the fixed arms 54a, 54b, and can comprise a flared and/or wedged profile which at least protrudes beyond the width of the fixed arms 54a, 54b. The support gusset 56a can connect the stiffening plates 58a, 58a on the first fixed arm 54a, and the support gusset 56b can connect the stiffening plates 58b, 59b on the second fixed arm 54b.

The stiffening plates 58a, 58b, 59a, 59d and/or the support gussets 56a, 56b can reinforce the fixed arms 54a, 54b relative to the hoist frame 24. For example, the stiffening plates 58a, 58b, 59a, 59d and/or the support gussets 56a, 56b can strengthen and rigidify the fixed arms 54a, 54b to stabilize the arms 54a, 54b and prevent deflection of the arms 54a, 54b during a rear-end collision.

In various instances, the pivot arms 52a, 52b can be configured to pivot relative to the fixed arms 54a, 54b, respectively. For example, the second pivot arm 52a can be coupled to the fixed arm 54a at a third pivot joint 50a, and the second pivot arm 52b can be coupled to the fixed arm 54b at a fourth pivot joint 50b, for example. The third pivot joint 50a and the fourth pivot joint 50b can be aligned with an axis z. In such instances, the second pivot arm 52a can pivot relative to the fixed arm 54 around the axis z at the third pivot joint 50a, for example, and the second pivot arm 52b can pivot relative to the fixed arm 54b around the axis z at the fourth pivot joint 50b, for example. Referring primarily to FIG. 6, each second pivot arm 52a, 52b can comprise an I-beam having a first plate or flange, a second plate or flange, and a web therebetween. In various instances, the flanges can define a uniform and/or constant width along the length thereof. During a rear-end collision, the I-beam structure can prevent buckling and/or deformation of the second pivot arms 52a, 52b.

As described herein, the support assembly 34 shown in FIG. 6 is mounted to the trailer 20 at multiple locations. For example, the support assembly 34 is pivotably mounted to the fixed frame 18 at the first pivot joint 42 of the mount assembly 21 and is fixed relative to the hoist frame 24 by the fixed arms 54a, 54b and/or stiffening plates 58a, 58b, 59a, 59d. The fixed frame 18 and the hoist frame 24 can be comprised of appropriate material to support the guard assembly 32 and to resist deformation during a rear-end collision.

As further described herein, the support assembly 34 includes multiple pivot joints. The pivot joints 42, 46, 50a, and 50b permit the support assembly 34 to move between the compacted configuration (FIGS. 3 and 5) and the extended configuration (FIGS. 1, 4, and 6) relative to the trailer 20. In the compacted configuration, the support assembly 34 is configured to lift the rear guard assembly 60 out of contact with the ground. Moreover, in the extended configuration, the support assembly 34 is configured to move the rear guard assembly 60 into a rearward facing position such that the guard assembly 32 is prepared to absorb at least a portion of the impact from a rear-end collision.

As described herein, because the fixed arms 54a, 54b are fixedly connected to the hoist frame 24, movement of the hoist frame 24 is configured to move the fixed arms 54a, 54b of the support assembly 34. Moreover, such movement of the arms 54a, 54b causes the support assembly 34 to pivot and/or articulate between the compacted configuration and the extended configuration. When the support assembly 34 has been pivoted to the extended configuration, the support assembly 34 can withstand forces of at least 350 kN without deforming and/or deflecting. In other words, the support assembly 34 is sufficiently strong and rigid to prevent deformation during the testing described in U.S. Standard 223 and Canadian Standard 223.

In various instances, the second pivot arms 52a, 52b can be fastened to the rear guard assembly 60. For example, each second pivot arm 52a, 52b can be bolted and/or otherwise secured to a brace assembly 80a, 80b, respectively, of the rear guard assembly 60. As described herein, the brace assemblies 80a, 80b are configured to deform to absorb at least a portion of the impact from a rear-end collision. Moreover, the degree of deformation of the brace assemblies 80a, 80b can be controlled by the material, structure and/or geometry of the brace assemblies 80a, 80b. In various instances, the brace assemblies 80a, 80b can each withstand a force of 50 kN prior to deformation. At and/or above the threshold force of 50 kN, the brace assemblies 80a, 80b can be designed to deform by no more than 125 mm and/or a distance defined by the applicable regulations.

The brace assemblies 80a, 80b depicted in FIGS. 6-10 are configured to support the rearward-facing guard plate 64. In various instances, the guard plate 64 includes a rear panel 62 and elongate flanges 61, 63. For example, in the depicted embodiment, the rear panel 62 extends between the top flange 61 and the bottom flange 63. In such instances, the guard plate 64 forms a C-beam.

Each brace assembly 80a, 80b includes an outside member 90a, 90b, respectively, and a collapsible shock absorber 82a, 82b positioned inside or within the corresponding outside member 90a, 90b, respectively. For example, the first brace assembly 80a depicted in FIGS. 6-10 includes the first outside member 90a and the first collapsible shock absorber 82a. Moreover, the second brace assembly 80b depicted in FIGS. 6-9 includes the second outside member 90b and the second collapsible shock absorber 82b, for example. In other embodiments, the guard assembly 32 can include a single brace or can include more than three braces.

The outside members 90a, 90b can be formed from blanks of ¼ inch A36 steel measuring 3½ inches by 34³⁄₃₂, for example. In other instances, the blanks can comprise a different width, height, and/or length. The outside members 90a, 90b can each be bent to form a generally V-shaped brace, as described herein. Side portions 91, 93 (FIG. 10) of each outside member 90a, 90b can extend at an angle of approximately 23 degrees from an intermediate portion 96 of the outside member 90a, 90b. The angled side portions 91, 93 can comprise a length of approximately 11½ inches, for example.

In various instances, the outside members 90a, 90b can comprise support plates that are secured to the rear guard 60 at both ends. For example, referring primarily to the first brace assembly 80a depicted in FIG. 10, the first support plate 90a includes a first end 92 and a second end 94. The first end 92 and the second end 94 are secured to the rear guard 60, for example. In various instances, the first end 92 and the second end 94 can be welded to the rear guard 60 at welds 68 and 69 (FIG. 10), respectively. In various instances, the outside members 90a, 90b can be designed to resist deformation under certain threshold loads and collapse when the load exceeds the threshold. For example, the outside members 90a, 90b can be comprised of a high strength low alloy steel, which can resist deformation at loads below 50 kN and can permit collapse at loads above 50 kN. As described herein, collapse of the braces 80a, 80b, including the outside members 90*a*, 90*b* thereof, can be restrained and/or limited to 125 mm of deflection during the testing described in U.S. Standard 223 and Canadian Standard 223.

Figure 10:
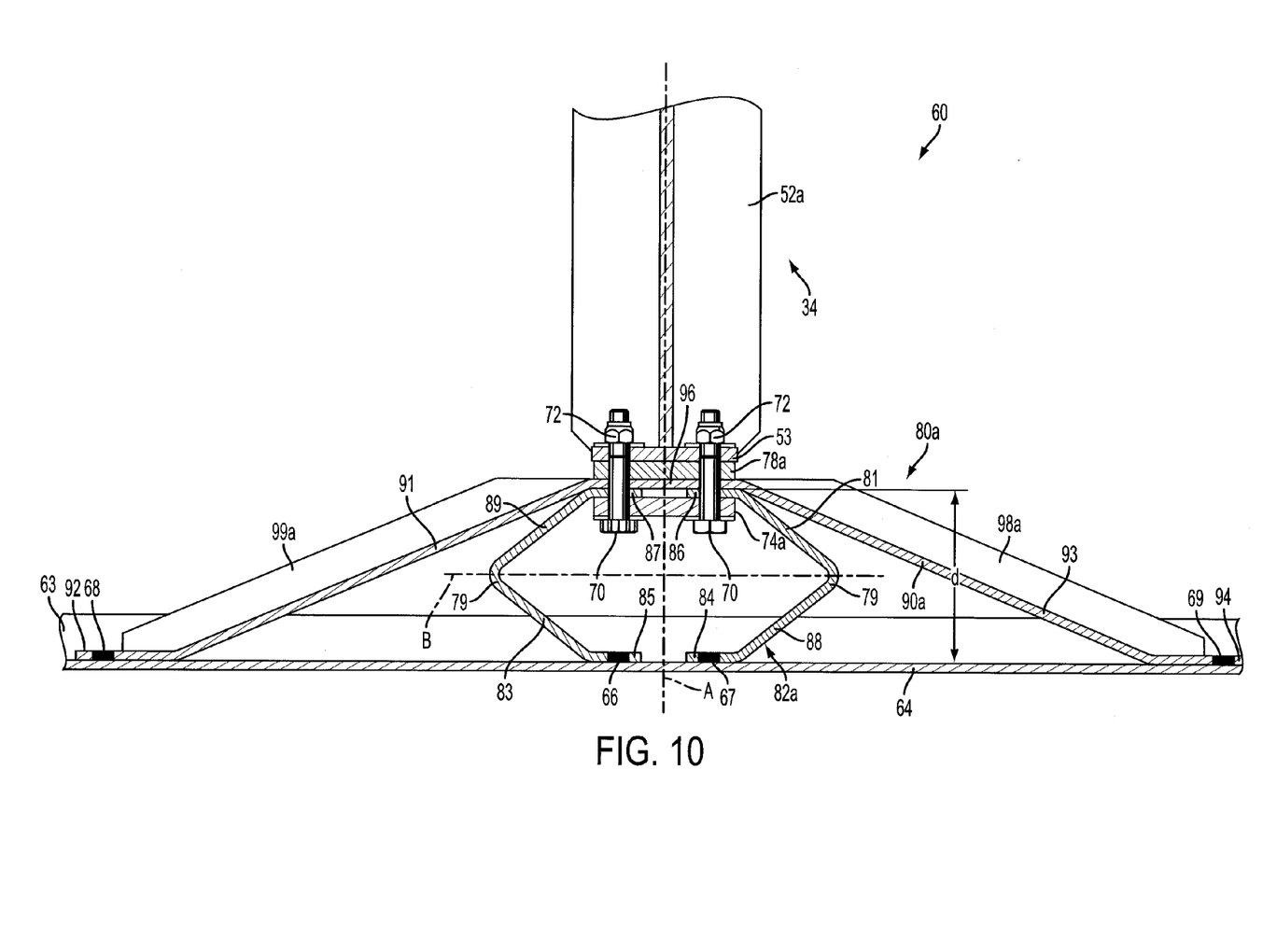
FIG. 10 is a plan, detail view of a brace of the rear guard of FIG. 9, according to various embodiments of the present disclosure.

Referring primarily to FIG. 10, the first support plate 90*a* includes the intermediate portion 96 between the first end 92 and the second end 94. The intermediate portion 96 can be about 3½ inches wide, for example. The intermediate portion 96 can be spaced a distance d from the rear guard 60. As described in greater detail herein, when the rear guard 60 is subjected to an impact, the first support plate 90*a* can be configured to deform and/or deflect and the distance d between the intermediate portion 96 and the rear guard 60 can be reduced to absorb at least a portion of the impact.

In certain embodiments, the intermediate portion 96 of each support plate 90*a*, 90*b* can be fastened and/or otherwise secured to the support assembly 34. For example, referring again to FIG. 10, the intermediate portion 96 of the first support plate 90*a* is fastened to the second pivot arm 52*a* of the support assembly 34. At least one fastener 70 and/or nut 72 can couple the support plate 90*a* to the rear end 53 of the second pivot arm 52*a*, for example. In the depicted embodiment, an arrangement of four equally-spaced fasteners 70 and nuts 72 are configured to secure the support plate 90*a* and the second pivot arm 52*a* together.

In the depicted arrangement, a forward spacer block 78*a*, 78*b* is positioned between each second pivot arm 52*a*, 52*b* and the corresponding support plate 90*a*, 90*b*, respectively. The forward spacer blocks 78*a*, 78*b* can be dimensioned to position the rear guard 60 and the rear panel 62 thereof a suitable distance toward the rear of the trailer 20 when the support assembly 34 is in the extended configuration. For example, the forward spacer blocks 78*a*, 78*b* can increase the distance of the rear panel 62 toward and/or beyond the rear of the trailer 20. As described herein, a standard and/or guideline can regulate the longitudinal distance between the rear-most portion of the chassis 20 and the rearward-facing guard plate 64. In such instances, the forward spacer blocks 78*a*, 78*b* can be designed to position the guard plate 64 the appropriate distance(s) toward the rear-most portion of the chassis 20.

Referring still to FIGS. 6-10, the support plates 90*a*, 90*b* can include ribs or flanges. For example, in the depicted embodiment, the first support plate 90*a* includes first and second ribs 98*a*, 99*a*, and the second support plate 90*b* includes first and second ribs 98*b*, 99*b*, for example. In various instances, the ribs 98*a*, 99*a*, 98*b*, 99*b* can be configured to control bowing and/or deflection of the support plates 90*a*, 90*b*. In various instances, the ribs 98*a*, 98*b*, 99*a*, 99*b* can be formed from ¼ inch A36 steel.

In various instances, each collapsible shock absorber 82*a*, 82*b* can include a first side 81 and a second side 83. The two sides 81, 83 can form a hexagonal shape when the collapsible shock absorber 82*a*, 82*b* is mounted between the corresponding outside member 90*a*, 90*b*, respectively, and the rear guard 60, as described herein. Each side 81 can be formed into V-shape member having a bend or fold 79 in the middle. The first side 81 can include a first mount 84 and a second mount 86, for example, and the second side can include a first mount 85 and a second mount 87. Referring to the embodiment depicted in FIG. 10, the first mounts 84, 85 can be fastened and/or otherwise secured to the rear guard 60, and the second mounts 86, 87 can be fastened and/or otherwise secured to the deformable support plate 90*a*. In various instances, the first mounts 84, 85 can be welded to the rear guard 60 at welds 66, 67 (FIG. 10), respectively for example. Furthermore, in certain instances, referring still to the embodiment depicted in FIG. 10, the second mounts 86, 87 can be secured to the intermediate portion 96 of the rear guard 60. In various instances, the fasteners 70 and nuts 72 engaged with the second pivot arm 52*a*, the forward spacer block 78, and/or the deformable support plate 90*a* can also engage the second mounts 86, 87 of the collapsible shock absorber 82*a*.

Each side 81, 83 of the collapsible shock absorber 82*a*, 82*b* can further include an outwardly-protruding or outwardly-deflecting portion 88, 89, which forms the V-shape. For example, referring again to the embodiment depicted in FIG. 10, the first side 81 of the first collapsible shock absorber 82*a* can include a first outwardly-protruding portion 88 intermediate the first mount 84 and the second mount 86. Additionally, the second side 83 of the first collapsible shock absorber 82*a* can include a second-outwardly-protruding portion 89 intermediate the first mount 85 and the second mount 87. The lateral-most and/or outermost portion of each outwardly-protruding portion 88, 89 can define the bend or fold 79.

In various instances, a space can be defined by the collapsible shock absorbers 82*a*, 82*b*. For example, referring to FIG. 10, a distance can be defined between the first mount 84, 85 of each side 81, 83, respectively, and the second mount 86, 87 of the corresponding side 81, 83, respectively. The distance can be flexibly maintained by the outwardly-protruding portions 88 and 89. As described in greater detail herein, when the rear guard 60 is subjected to an impact, the outwardly-protruding portions 88, 89 can deflect further outward such that the distance defined between the first mount 84, 85 of each side 81, 83, respectively, and the second mount 86, 87 of the corresponding side 81, 83, respectively, is reduced as the energy of the impact is at least partially absorbed.

The distance between the first mount 84, 85 of each side 81, 83, respectively, and the second mount 86, 87 of the corresponding side 81, 83, respectively can be less than 125 mm. For example, in the depicted embodiment, the distance is approximately 100 mm. In various instances, deformation and/or collapse of the braces 80*a*, 80*b* can be restrained by the distance. For example, deformation and/or collapse of the braces 80*a*, 80*b* can be limited to approximately 100 mm when the distance is approximately 100 mm. In such instances, deformation of the guard assembly 32 can be within the range defined by U.S. Standard 223 and Canadian Standard 223 during the testing set forth therein. Moreover, because the approximately 100 mm distance is less than the 125 mm deflection permitted by U.S. Standard 223 and Canadian Standard 223, if an element of the support assembly, such as the second pivot arms 52*a*, 52*b* and/or fixed arms 58*a*, 58*b*, for example, slightly springs forward and/or deforms under the testing forces set forth in U.S. Standard 223 and/or Canadian Standard 223, the guard assembly 32 can still meet the required deflection range of 125 mm.

Referring still to the brace assemblies 80*a*, 80*b* depicted in FIGS. 6-9, each brace assembly 80*a*, 80*b* further includes a rearward spacer block 74*a*, 74*b*. In the depicted arrangement, each rearward spacer block 74*a*, 74*b* is positioned in the space defined by the collapsible shock absorber 82*a*, 82*b*, respectively. The rearward spacer blocks 74*a*, 74*b* can be positioned and dimensioned to control the degree of deflection of the collapsible shock absorber 82*a*, 82*b*, respectively. For example, referring again to FIG. 10, the collapsible shock absorber 82*a* can be configured to deform. As the shock absorber 82*a* is deformed, the first mounts 84, 85 can move toward the second mounts 86, 87, respectively, and the outwardly-protruding portions 88, 89 can bow and/or deflect laterally. The shock absorber 82a can continue to deform until the rearward spacer block 74a and/or the heads of the fasteners 70 protruding from the rearward spacer block 74a are moved into abutting contact with the first mounts 84, 85 of the first and second side portions 81, 83. The spacer block 74a can be comprised of A36 steel or a 36K material.

The rearward spacer block 74a is configured to limit the degree of travel to a suitable distance. For example, the rearward spacer blocks 74a, 74b can be dimensioned to adjust the amount of deflection of the rear panel 62 toward the trailer 20. In various instances, the rearward spacer blocks 74a, 74b can comprise a thickness of 0.5 inches, such that the degree of permitted deformation is reduced by 0.5 inches. When the braces 80a, 80b are fully deformed within the range permitted by the spacer blocks 74a, 74b, the remaining force of the impact can be transferred to the support assembly 34. Moreover, the rearward spacer blocks 74a, 74b can be removed and/or replaced with spacer blocks having different dimensions to affect the degree of allowable deformation.

In certain embodiments, the brace assemblies 80a, 80b and/or the components and/or the subassemblies thereof can be symmetrical. For example, referring to the embodiment depicted in FIG. 10, the brace assembly 80a is symmetrical relative to an axis A. The axis A can comprise a longitudinal axis that is aligned with the second pivot arm 52a. In various instances, the support plate 90a and the collapsible shock absorber 82a are symmetrical relative to the axis A. More particularly, the first side 81 of the collapsible shock absorber 82a is a mirror image of the second side 83 of the collapsible shock absorber 82a along the axis A. In such instances, the forces exerted on the rear panel 62 can be evenly distributed throughout the brace assembly 80a.

Figure 11:
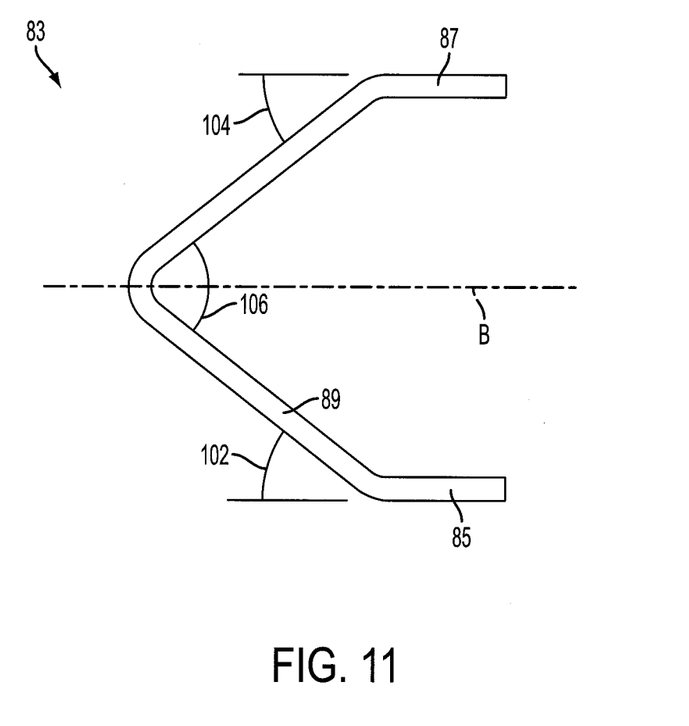
FIG. 11 is a plan view of a side portion of the brace of FIG. 10, according to various embodiments of the present disclosure.

Referring now to FIGS. 10 and 11, the collapsible shock absorber 82a is also symmetrical relative to an axis B. The axis B depicted in FIG. 10 is perpendicular to the axis A, for example. Moreover, the axis B extends through the outwardly-protruding portion 89 intermediate the first mount 85 and the second mount 87 and is parallel to the rear panel 62 and to the intermediate portion 96 of the outside member 90a, 90b. The axis B can be aligned with the bends 79 in the collapsible shock absorber 82a, 82b. Moreover, the axis B can be equidistant from first mount 84 and the second mount 86, and equidistant from first mount 85 and the second mount 87. The axis B can define a lateral axis that is perpendicular to the longitudinal axis A.

As depicted in FIG. 10, the rear portion of the collapsible shock absorber 82a is a mirror image of the forward portion of the collapsible shock absorber 82a along the axis B. For example, referring to FIG. 11, the angle 102 between the first end 85 and the outwardly-protruding portion 89 is equal to the angle 104 between the second end 87 and the outwardly-protruding portion 89. Moreover, the angle 106 defined by the outwardly-protruding portion 89 is equal to the sum of the angles 102 and 104. For example, the angles 102 and 104 can comprise 40 degrees, and the angle 106 can comprise 80 degrees, for example. In various instances, the first side 81 can also be symmetrical relative to the axis B. Due to the symmetry of the inside members 82a, 82b, the braces 80a, 80b can be configured to deform symmetrically and to evenly distribute the impact forces from a rear-end collision. In various instances, the collapsible shock absorber 82a, 82b can be formed from a blank of ¼ inch A36 steel, wherein the blank is 3½ inches by 9¾ inches. The blank can be bent at the fold 79.

The bumper assembly described herein is designed to conform to U.S. Standard 223 and Canadian Standard 223. For example, U.S. Standard 223 requires the vertical height of the rearward-facing guard 64 to be at least 100 mm at each point across the guard width when projected horizontally on a transverse vertical plane when the guard assembly 32 is mounted to the trailer 20. Accordingly, the rear panel 62 of the rear guard 60 can comprise a vertical height of at least 100 mm along the length of the rear panel 62. In other instances, such as for alternative applications, for example, rear panel 62 can comprise a width that is less than 100 mm at least one point along the length thereof.

U.S. Standard 223 also requires that all portions of the rear guard necessary to achieve the 100 mm vertical height requirement are positioned no more than 305 mm forward of the vehicle's rear extremity. To satisfy this requirement, various dimensions of the support assembly 34 and/or the rear guard 60 can be selected to appropriately position the rear panel 62. For example, the forward spacer blocks 78a, 78b can be dimensioned to shift the brace assemblies 80a, 80b and the rear guard 60 rearward to meet the requirements of U.S. Standard 223. In other instances, such as for alternative applications, for example, the spacer blocks 78a, 78b can be selected to achieve different goals and/or standards. In various instances, the spacer blocks 78a, 78b can be about 3½ inches by 3½ inches by ½ inch, for example.

As set forth herein, U.S. Standard 223 also sets forth strength requirements and energy absorption requirements. A goal of the strength and energy absorption requirements can be to require deformation and absorption of at least a portion of the impact energy during a rear-end collision such that the vehicle occupant(s) and/or load(s) are not subjected to that impact energy and, thereafter, to rigidly resist further deformation. For example, U.S. Standard 223 requires the guard to (a) resist a force of 50,000 N without deflecting by more than 125 mm when the force is applied to a point 50 mm above the bottom of the rear guard 60 and ⅜ of the width of the guard measured from the midpoint of the rear guard 60 on either side of the midpoint, (b) resist a force of 50,000 N without deflecting by more than 125 mm when the force is applied to a point 50 mm above the bottom of the rear guard 60 and at the midpoint of the rear guard 60, and (c) resist a force of 100,000 N without deflecting by more than 125 mm when the force is applied to a point 50 mm above the bottom of the rear guard 60 and between 355 mm and 635 mm from the midpoint of the rear guard 60 on either side of the midpoint. Accordingly, the rear guard 60 and the support assembly 34 can be configured to resist deformation of more than 125 mm when the 50,000 N and 100,000 N forces are applied to the rear panel 62 at the locations set forth above. For example, the brace assemblies 80a, 80b can be sufficiently strong and robust such that the brace assemblies 80a, 80b and rear panel 62 do not collapse by more than 125 mm when the various forces are applied. The longitudinal distance defined by the collapsible shock absorbers 90a, 90b and the rearward spacer blocks 78a, 78b can control the amount of deflection, for example. Moreover, the support assembly 34 can be sufficiently strong and robust such that the forces transferred to the support assembly 34 do not otherwise and/or significantly deform the support assembly 34. In other instances, such as for alternative applications, for example, the rear guard 60 and/or the support assembly 34 can exceed and/or fall short of the strength requirements of U.S. Standard 223.

U.S. Standard 223 also requires the guard assembly 32 to absorb at least 5,650 J of energy by plastic deformation within the first 125 mm of deformation at the various test locations set forth above. To satisfy this requirement, the brace assemblies 80*a*, 80*b* can be designed to plastically and/or irreversibly deform and/or collapse within the first 125 mm of deformation during a rear-end collision and to absorb at least 5,650 J of energy within the first 125 mm of deformation. The robustness of the brace assemblies 80*a*, 80*b* and the support assembly 34 can permit the guard assembly 32 to absorb at least 5,650 J of energy within the first 125 mm of deformation.

The guard assembly 32 described herein can also satisfy the strength requirements of Canadian Standard 223 such that it deflects no more than 125 mm when a uniform load is applied to the rear panel 62. The guard assembly 32 can also satisfy the energy absorption requirements of Canadian Standard 223 such that the brace assemblies 80*a*, 80*b* plastically and/or irreversibly deform and/or collapse within the first 125 mm of deformation during a rear-end collision and can absorb at least 20 kJ of energy within the first 125 mm of deformation.

The reader will appreciate that though a chassis having a hoist frame is depicted in FIGS. 1-3, the person of ordinary skill in the art will readily appreciate that the various devices and methods disclosed herein can be used in connection with different vehicles, trailers, and semitrailers, for example. For example, the guard assembly described herein can be mounted to a heavy-duty or light-weight motor vehicle which may or may not comprise a hoist frame and/or a hoist apparatus. Moreover, while the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A guard assembly, comprising:
   a support assembly comprising a plurality of arms;
   a plurality of braces, wherein each brace is supported by one of the arms of the support assembly, and wherein each brace comprises:
      a collapsible stiffener comprising a pair of symmetrical folds; and
      a spacer positioned intermediate the pair of symmetrical folds; and
   a rearward-facing guard plate mounted to the plurality of braces.

2. The guard assembly of claim 1, wherein each brace further comprises a support plate comprising a pair of angled supports, wherein the collapsible stiffener is positioned intermediate the angled supports.

3. The guard assembly of claim 1, wherein the plurality of arms comprises a pivot arm coupled to each brace, and wherein the pivot arms comprise I-beams.

4. The guard assembly of claim 3, wherein the plurality of arms further comprises a pair of fixed arms, and wherein each fixed arm comprises:
   a pair of stiffening plates; and
   a support gusset.

5. The guard assembly of claim 3, wherein a longitudinal axis is aligned with the pivot arm coupled to each brace, and wherein each brace is symmetrical relative to the longitudinal axis.

6. The guard assembly of claim 5, wherein the symmetrical folds are configured to deflect laterally with respect to the longitudinal axis.

7. A guard assembly, comprising:
   a guard plate;
   a plurality of braces mounted to the guard plate, wherein each brace comprises a collapsible shock absorber comprising:
      a first end;
      a second end, wherein a longitudinal axis is aligned with the first end and the second end; and
      a plurality of outwardly-protruding portions between the first end and the second end, wherein a lateral axis traverses the outwardly-protruding portions and is oriented perpendicular to the longitudinal axis, and wherein the outwardly-protruding portions are symmetrical relative to the lateral axis.

8. The guard assembly of claim 7, wherein the collapsible shock absorber is symmetrical relative to the longitudinal axis.

9. The guard assembly of claim 7, wherein the collapsible shock absorber comprises a hexagonal geometry, and wherein each outwardly-protruding portion forms a pair of sides of the hexagonal geometry.

10. The guard assembly of claim 7, wherein the outwardly-protruding portions are configured to deflect outward along the lateral axis when the second end moves toward the first end along the longitudinal axis.

11. The guard assembly of claim 7, further comprising a spacer positioned between the first end and the second end.

12. The guard assembly of claim 7, wherein each brace further comprises an outside member, and wherein one of the collapsible shock absorbers is positioned between the guard plate and the outside member of each brace.

13. The guard assembly of claim 12, wherein each outside member comprises:
   a first end portion mounted to the guard plate;
   a second end portion mounted to the guard plate; and
   an intermediate portion mounted to the collapsible shock absorber.

14. The guard assembly of claim 13, wherein the first end of each collapsible shock absorber is fastened to the intermediate portion of the outside member of the same brace.

15. The guard assembly of claim 13, wherein the outside member is symmetrical relative to the longitudinal axis.

16. The guard assembly of claim 12, wherein each outside member and each collapsible shock absorber are welded to the guard plate.

17. The guard assembly of claim 8, further comprising a support assembly comprising a plurality of pivot arms.

18. The guard assembly of claim 17, wherein the plurality of pivot arms comprises a pivot arm coupled to each brace, and wherein the pivot arms comprise I-beams.

19. The guard assembly of claim 17, wherein the support assembly further comprises a pair of fixed arms, and wherein each fixed arm comprises:
   a pair of stiffening plates; and
   a support gusset.

* * * * *

UNITED STATES PATENT AND TRADEMARK OFFICE
CERTIFICATE OF CORRECTION

PATENT NO. : 9,555,755 B2  
APPLICATION NO. : 14/600539  
DATED : January 31, 2017  
INVENTOR(S) : Nicholas S. Franiak and Nathan L. Martindale

Page 1 of 1

It is certified that error appears in the above-identified patent and that said Letters Patent is hereby corrected as shown below:

In the Claims

Column 14, Line 63, please delete "claim 8" and replace with --claim 7--.

Signed and Sealed this  
Fourteenth Day of May, 2019

Andrei Iancu  
*Director of the United States Patent and Trademark Office*